United States Patent
Smith et al.

(10) Patent No.: US 9,384,393 B2
(45) Date of Patent: Jul. 5, 2016

(54) CHECK DATA LIFT FOR ERROR DETECTION

(71) Applicant: Bank of America Corporation, Charlotte, NC (US)

(72) Inventors: Michael Gerald Smith, Fort Mill, SC (US); Scott Andrew Johnson, Atlanta, GA (US); Saravana Kumar Govindarajan, Atlanta, GA (US); Michael Scott Hjellming, Cherryville, NC (US); Brian David Hanson, Charlotte, NC (US); Hyunmo Koo, Atlanta, GA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/065,821

(22) Filed: Oct. 29, 2013

(65) Prior Publication Data

US 2015/0117747 A1 Apr. 30, 2015

(51) Int. Cl.
*G06K 9/00* (2006.01)
(52) U.S. Cl.
CPC ........ *G06K 9/00469* (2013.01); *G06K 2209/01* (2013.01)
(58) Field of Classification Search
None
See application file for complete search history.

(56) References Cited

U.S. PATENT DOCUMENTS

| | | | |
|---|---|---|---|
| 4,258,644 A | 3/1981 | Goettert et al. | |
| 5,097,517 A | 3/1992 | Holt | |
| 5,433,483 A | 7/1995 | Yu | |
| 5,644,352 A | 7/1997 | Chang et al. | |
| 5,668,897 A | 9/1997 | Stolfo | |
| 5,704,651 A | 1/1998 | Phillips | |
| 5,740,271 A | 4/1998 | Kunkler et al. | |
| 5,748,780 A | 5/1998 | Stolfo | |
| 5,873,604 A | 2/1999 | Phillips | |
| 6,125,196 A | 9/2000 | Carey et al. | |
| 6,564,996 B2 | 5/2003 | Hoffman et al. | |
| 6,574,377 B1 | 6/2003 | Cahill et al. | |
| 7,104,709 B1 | 9/2006 | Maher et al. | |
| 7,364,071 B2 | 4/2008 | Esplin et al. | |
| 7,494,052 B1 | 2/2009 | Carpenter et al. | |
| 7,631,801 B2 | 12/2009 | Sellen et al. | |
| 7,729,990 B2 | 6/2010 | Marceau et al. | |
| 7,856,403 B2 | 12/2010 | Venturo et al. | |
| 7,876,949 B1 | 1/2011 | Oakes, III et al. | |
| 8,141,692 B2 | 3/2012 | Spall et al. | |
| 8,162,125 B1 * | 4/2012 | Csulits et al. | 194/206 |
| 8,165,381 B1 | 4/2012 | Ferris et al. | |
| 8,351,677 B1 | 1/2013 | Oakes, III et al. | |
| 8,660,984 B1 | 2/2014 | Bhattacharyya et al. | |
| 8,768,038 B1 | 7/2014 | Sherman et al. | |
| 2002/0012462 A1 | 1/2002 | Fujiwara | |
| 2002/0052852 A1 | 5/2002 | Bozeman | |
| 2002/0076093 A1 | 6/2002 | Palmer et al. | |
| 2002/0091945 A1 | 7/2002 | Ross | |
| 2003/0059098 A1 | 3/2003 | Jones et al. | |

(Continued)

*Primary Examiner* — Weiwen Yang
(74) *Attorney, Agent, or Firm* — Michael A. Springs; Moore & Van Allen PLLC

(57) ABSTRACT

Embodiments for identifying errors based on data extracted from financial record images includes systems that receive one or more financial record images from a user, apply an optical character recognition process to at least a portion of the one or more financial record images, and identify record data based on the applied optical character recognition process comprising at least a name of a party to the financial record. The systems further identify errors associated with the one or more financial record images based on the record data.

16 Claims, 10 Drawing Sheets

(56) References Cited

U.S. PATENT DOCUMENTS

| | | |
|---|---|---|
| 2003/0177100 A1 | 9/2003 | Filatov |
| 2004/0254881 A1 | 12/2004 | Kumar et al. |
| 2005/0021456 A1 | 1/2005 | Steele et al. |
| 2005/0021466 A1 | 1/2005 | Buchanan et al. |
| 2005/0125339 A1 | 6/2005 | Tidwell et al. |
| 2005/0163362 A1 | 7/2005 | Jones et al. |
| 2005/0182792 A1 | 8/2005 | Israel et al. |
| 2006/0278724 A1 | 12/2006 | Walker et al. |
| 2007/0235520 A1 | 10/2007 | Smith et al. |
| 2007/0255653 A1 | 11/2007 | Tumminaro et al. |
| 2007/0288382 A1* | 12/2007 | Narayanan et al. ............ 705/45 |
| 2008/0086421 A1 | 4/2008 | Gilder et al. |
| 2008/0167990 A1 | 7/2008 | Grant |
| 2008/0180750 A1 | 7/2008 | Feldman |
| 2008/0219543 A1 | 9/2008 | Csulits et al. |
| 2008/0247629 A1 | 10/2008 | Gilder et al. |
| 2009/0114716 A1 | 5/2009 | Ramachandran |
| 2009/0141962 A1 | 6/2009 | Borgia et al. |
| 2009/0144129 A1 | 6/2009 | Grouf et al. |
| 2009/0222364 A1 | 9/2009 | McGlynn et al. |
| 2009/0276368 A1 | 11/2009 | Martin et al. |
| 2009/0285471 A1* | 11/2009 | Wall et al. .................... 382/137 |
| 2010/0082470 A1 | 4/2010 | Walach et al. |
| 2010/0296719 A1 | 11/2010 | Williamson et al. |
| 2011/0087598 A1 | 4/2011 | Bozeman |
| 2011/0170740 A1 | 7/2011 | Coleman |
| 2011/0208588 A1 | 8/2011 | Joa et al. |
| 2013/0315467 A1 | 11/2013 | Hawkins |

* cited by examiner

Payor Name
Payor Address xxxx

Date  xx/xx/xxxx

PAY TO THE
ORDER OF  Payee Name 1  $ $XXX.xx

XX XX-XX and xx/100  DOLLARS

My Bank
My Bank's Address

SIGNATURE  *Payor Name*

MEMO  XXXXXX

I:XXXXXXXX I:  XXXXXXXXX *I:

*712*

*750*

Endorse Here
*I sign the entire*
*amount of this check*
*over to Payee Name 2*
*-Payee Name 1*
*Month/Day, Year*
*Payee Name 2*

*755*

CHECK DATA LIFT FOR ERROR DETECTION

BACKGROUND

Certain businesses often receive large quantities of images related to financial transactions. In some cases, check images may be processed for various reasons. Due to the varied period of time that the image records are stored, the many different types of records received by the businesses, and the large volume of records, organizing and analyzing the image records can be difficult. Further still, in some instances businesses may receive the same or similar images from a wide variety of entities, and determining which images must be processed and retained can present even more difficulties.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments provided herein are directed to systems for identifying errors based on data extracted from an image. In some embodiments, the systems include a computer apparatus including a processor and a memory; and a software module stored in the memory, comprising executable instructions that when executed by the processor cause the processor to receive the image from a user, the image comprising a financial record. In some embodiments, the executable instructions further cause the processer to apply an optical character recognition process to at least a portion of the image. In some embodiments, the executable instructions further cause the processer to identify record data based on the applied optical character recognition process comprising at least a name of a party to the financial record. In some embodiments, the executable instructions further cause the processer to identify errors associated with the image based on the record data, the errors comprising at least one of errors associated with the image, errors associated with a financial transaction, errors associated with processing of the financial record, and errors in the record data.

In additional embodiments of the systems, the executable instructions further cause the processor to apply an additional optical character recognition process to at least a portion of the image. In some embodiments, the executable instructions further cause the processor to send the image to an investigation group; receive instructions from the investigation group; and process the financial record based on the instructions. In other embodiments, the executable instructions further cause the processor to identify a payee name in the image based on the applied optical character recognition process and compare the payee name and the user, wherein the image comprises an image of a check. In still other embodiments, the executable instructions further cause the processor to determine that the payee name and the user match and process the check in response to the match.

In some embodiments, the executable instructions further cause the processor to determine that the payee name and the user do not match. In other embodiments, the executable instructions further cause the processor to determine that the user is authorized to deposit the check and process the check in response to the authorization determination. In still other embodiments, the executable instructions further cause the processor to determine that the user is not authorized to deposit the check and send the check image to an investigation group. In additional embodiments, the executable instructions further cause the processor to detect unrecognized data from the check image; receive input information identifying the unrecognized data from an operator, wherein the record data comprises at least a portion of the inputted information. In some embodiments, the executable instructions further cause the processor to receive additional input information from a customer and correct the operator inputted information based on the additional input. In further embodiments, the record data further comprises a payor name, an account number, terms of the financial record, time period that the financial record is in effect, check numbers, endorsements, merchant codes, file identifiers, or source identifiers.

Also provided herein, are embodiments directed to a computer program product for identifying errors based on data extracted from an image. In some embodiments, the computer program product includes a computer readable storage medium having computer readable program code embodied therewith, the computer readable program code comprising computer readable program code configured to receive the image from a user, the image comprising a financial record. In some embodiments, the computer readable program code includes computer readable program code configured to apply an optical character recognition process to at least a portion of the image. In some embodiments, the computer readable program code includes computer readable program code configured to identify record data based on the applied optical character recognition process comprising at least a name of a party to the financial record. In some embodiments, the computer readable program code includes computer readable program code configured to identify errors associated with the image based on the record data, the errors comprising at least one of errors associated with the image, errors associated with a financial transaction, errors associated with processing of the financial record, and errors in the record data.

In additional embodiments, the computer readable program code includes computer readable program code configured to apply an additional optical character recognition process to at least a portion of the image. In some embodiments, the computer readable program code includes computer readable program code configured to send the image to an investigation group; receiving instructions from the investigation group; and process the image based on the instructions. In other embodiments, the computer readable program code includes computer readable program code configured to identify a payee name in the image based on the applied optical character recognition process; and compare the payee name and the user, wherein the image comprises an image of a check. In still other embodiments, the computer readable program code includes computer readable program code configured to determine that the payee name and the user do not match. In additional embodiments, the computer readable program code includes computer readable program code configured to determine that the user is authorized to deposit the check; and process the check in response to the authorization determination.

Further provided herein are embodiments directed to computer-implemented methods for identifying errors based on data extracted from an image. In some embodiments, the methods include receiving the image from a user, the image comprising a financial record. In some embodiments, the methods include applying, by a processor, an optical character recognition process to at least a portion of the image. In some embodiments, the methods include identifying, by a processor, record data based on the applied optical character recognition process comprising at least a name of a party to the financial record. In some embodiments, the methods include identifying, by a processor, errors associated with the image based on the record data, the errors comprising at least one of errors associated with the image, errors associated with a financial transaction, errors associated with processing of the financial record, and errors in the record data.

In additional embodiments, the methods include applying, by a processor, an additional optical character recognition process to at least a portion of the image. In further embodiments, the methods include sending, by a processor, the image to an investigation group, receiving instructions from the investigation group, and processing, by a processor, the financial record based on the instructions. In still further embodiments, the methods include identifying, by a processor, a payee name in the image based on the applied optical character recognition process, comparing the payee name and the user, determining that the payee name and the user match, and processing the financial record in response to the match.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 7 illustrates an exemplary image of a financial record in accordance with various embodiments;

DETAILED DESCRIPTION

Figure 1:
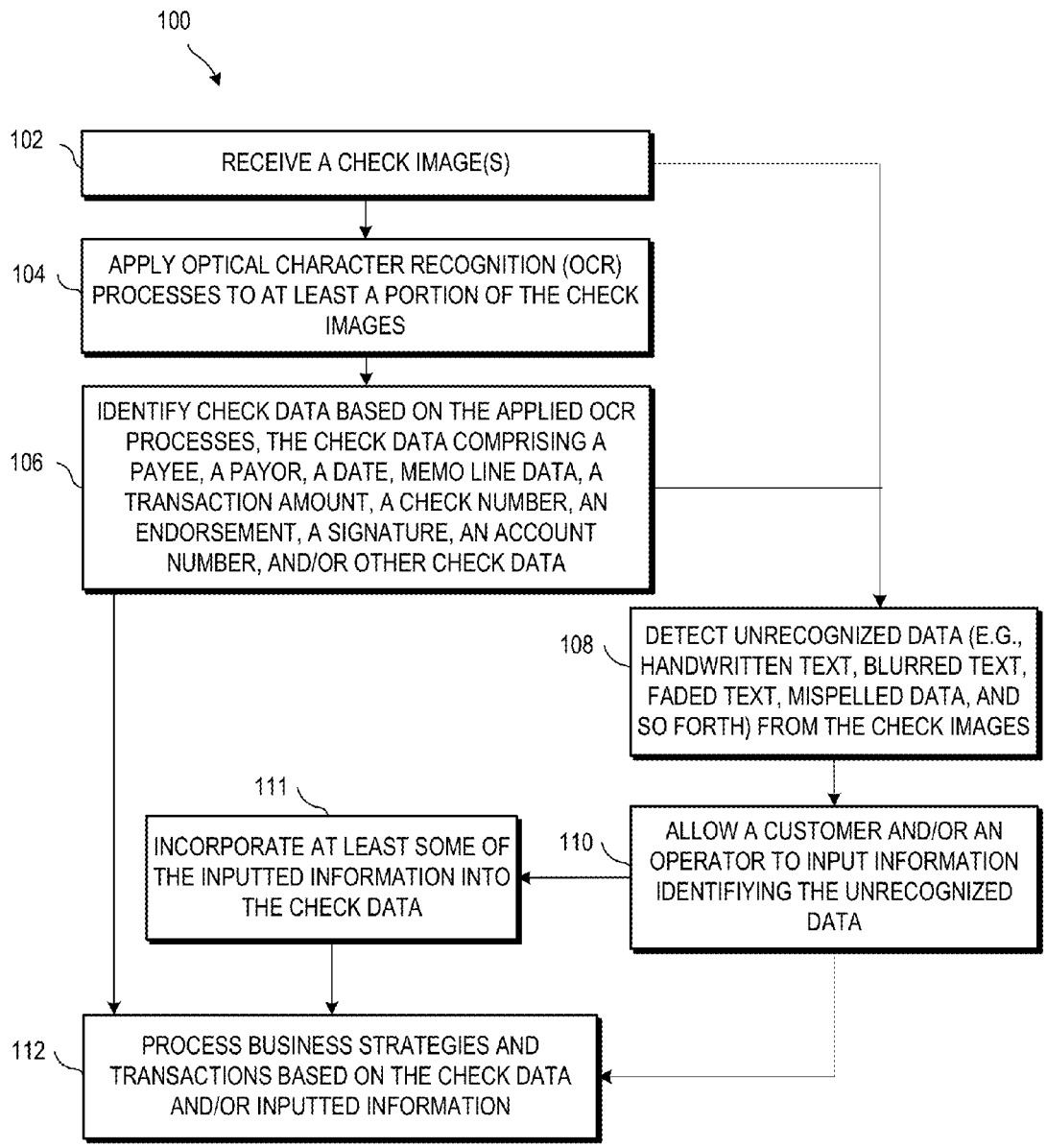
FIG. 1 is a flowchart illustrating a system and method for identifying and extracting check data in accordance with various embodiments.

The embodiments presented herein are directed to systems, methods, and computer program products for detecting and extracting data from check images. As presented herein, metadata extracted from the check images can be used in processing or automating transactions, implementing business strategies, and providing enhanced online account information to customers. In some embodiments, the images include images of check or other financial records captured by an account holder or other entity. In particular embodiments, optical character recognition processes and keying operations are utilized to extract the metadata from check or other financial instruments.

The embodiments of the disclosure may be embodied as a system, method, or computer program product. Accordingly, aspects of the present disclosure may take the form of an entirely hardware embodiment, an entirely software embodiment (including firmware, resident software, micro-code, and so forth) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that detect and extract specific data from images and that analyze, process, and distribute the metadata are provided. As used herein, the term "financial record" refers to, but is not limited to records associated with financial record data, account data, government data, legal data, identification data, and the like. Exemplary financial records include legal documents, wills, court papers, legal memorandum, leases, birth certificates, checks, receipts, contracts, loan documents, financial statements, bills, and the like. Although the disclosure is directed to financial records, it will be understood that non-financial records such as social communications, advertising, blogs, opinion writing, and the like may also be applicable to the disclosure presented herein. In cases were non-financial records are used, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof.

Referring now to the figures, FIG. 1 provides a flowchart illustrating a process 100 for detecting and extracting data from check images. One or more devices, such as the one or more systems and/or one or more computing devices and/or servers of FIG. 2, can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise at least a portion of the front of the check, at least a portion of the back of the check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100. Although check images are described in FIG. 1, it will be understood that any type of financial record image or non-financial record image may be included in process 100.

In some embodiments, each of the check images comprises financial record data. The financial record data includes dates of issuance of financial record, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like. In other embodiments, the check images comprise markings. The markings include, for example, text, numbers, symbols, other characters, lines, shadows, shapes, ink blots, stains, logos, paper tears, smudges, watermarks, any visible marking on the paper check, any visible marking applied electronically to the check image, or any pixel/texel quantity thereof.

Although check images are illustrated in FIG. 1, it will be understood that any type of image (e.g., PDF files, scanned documents, digital photographs with or without letters, numbers, and the like) or financial record may be received in accordance with the embodiments of FIG. 1. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, joint account holder, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert handwritten or printed text and other symbols in the check image to machine encoded text such as text based files that can be edited and searched. The data in the check images can also be extracted and converted into metadata, which can then be used and incorporated into a variety of applications, documents, and processes. In some embodiments, OCR based algorithms incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In additional embodiments, the OCR processes include intelligent character recognition (ICR), which can be used to recognize and extract handwritten portions or other portions of the check image.

In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants (see, e.g., FIG. 4).

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 106, check data is identified based on the applied OCR processes. In some embodiments, the check data comprises a payee, a payor, a date, memo line data, a payment amount, a check number, and endorsement, a signature and/or other check data. The check data, in some embodiments, is identified based on the final objectives of the process 100. As discussed in more detail below, the final objectives of the process 100 can include a variety of business strategies and transactions. In other embodiments, the system of process 100 identifies all recognizable text and markings in the check images. In such cases, the system may further narrow or expand the identified check data as needed.

In further embodiments, the system of process 100 assigns a confidence level to at least a portion of the identified check data. The confidence level includes a pass/fail rating, a graded score, a percentage score, an assigned value, or any other indication that the check data is accurate, relevant, or otherwise acceptable. In this way, any data identified and extracted via the OCR processes and/or any data inputted from an operator or customer can be screened before such data is used in the business strategies and transaction described herein below.

In some embodiments, the confidence level is assigned to the check data based on the number of times the OCR processes is applied to a check image, the quality of the check image, the quality of the identified check data extracted from the check image, whether or not the check data can be verified, and the like. If the check image includes blurred text or has a low pixel count, the text produced by a first round of the OCR processes may be assigned a low confidence level. In such cases, the confidence level may be increased if the check images undergo additional rounds of the OCR processes. In other cases, the system may compare the check data to previously confirmed data to assign the confidence level. For example, a verified signature or other verified data may be compared to the check data. If the check data and the previously confirmed data match, at least a portion of the check data may be assigned a "pass" score. In other instances, the check data may be assigned a "fail" score if the check data and confirmed data do not match. In cases where the confidence level is below a certain level or the check data is otherwise unsatisfactory, the system of process 100 may repeat the same of different OCR processes for at least a portion of a check image, apply a different data identification technique to the check image (e.g., image overlay), adjust the quality of the check image, receive confirmation of the check data from the customer, block further processing of the check images, provide the check images to an analysis group, and so forth.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct such text before applying the OCR processes to increase successfully recognition in the OCR processes or other image processes.

As illustrated at block 110, inputted information identifying the unrecognized data from a customer and/or an operator is received. In some embodiments, an operator is provided with the portions of a check image corresponding to the unrecognized data. The operator can view the unrecognized data to translate the unrecognized data into text and input the translation into a check data repository. In this way, the system "learns" to recognize previously unrecognized data such that when the system reviews the same or similar unrecognized data in the future, such data can be easily identified by reference to the check data repository. In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 111, at least some of the inputted information is incorporated in the check data. In cases where the OCR processes utilizes a repository that includes manual input such as the check data repository or customer input repository, previously unrecognized data can be matched to definitions submitted by the operator and/or customer.

As illustrated at block 112, business strategies and transactions are processed based on at least one of the check data and the inputted information. Metadata extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

Figure 2:
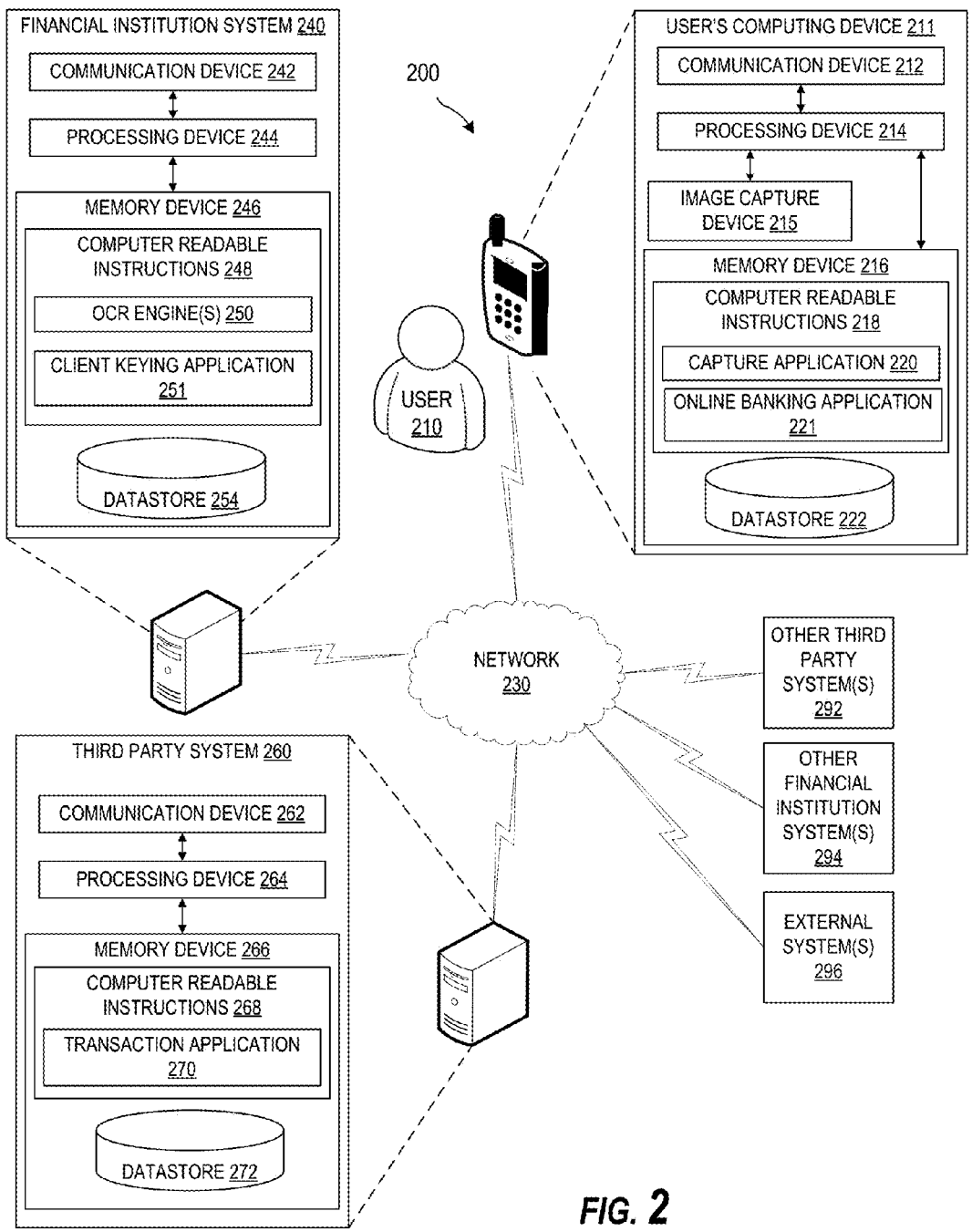
FIG. 2 provides a block diagram illustrating a system and environment for extracting and identifying check data in accordance with various embodiments.

Referring now to FIG. 2, a block diagram illustrates an environment 200 for detecting and extracting check data. The environment 200 includes a computing device 211 of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296. The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The computing device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's computing device 211 includes a communication device 212 and an image capture device 215 (e.g., a camera) communicably coupled with a processing device 214, which is also communicably coupled with a memory device 216. The processing device 214 is configured to control the communication device 212 such that the user's computing device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the user's computing device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the user's computing device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
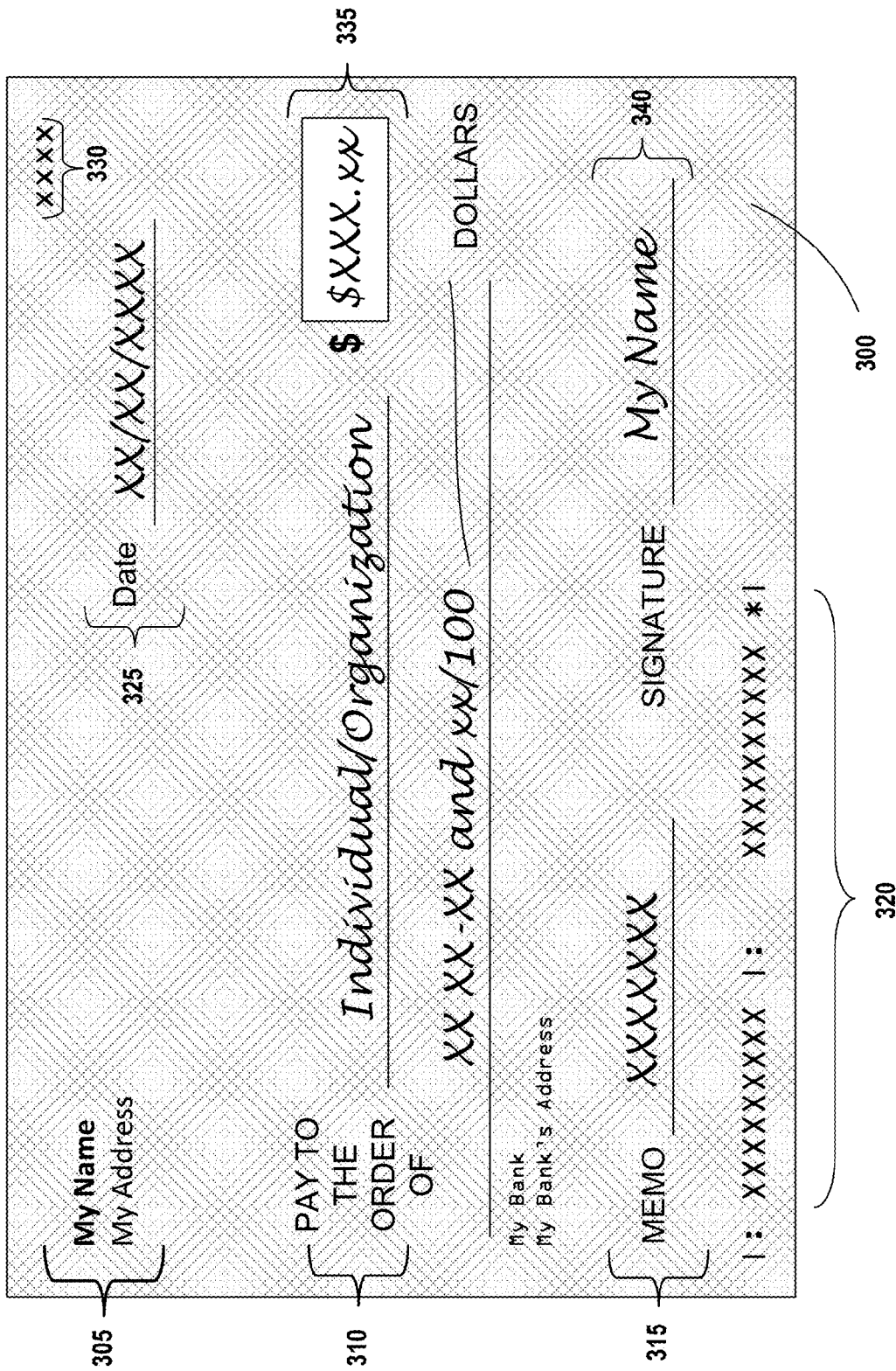
FIG. 3 illustrates an exemplary image of a financial record in accordance with various embodiments.

Referring now to FIG. 3, an exemplary image of a check 300 is illustrated. The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device (e.g., the user's computing device 212 of FIG. 2) may capture an image of the check 300 and transmit the image to a system of a financial institution (e.g., the financial institution system 240 of FIG. 2) via a network. The system may collect the check information from the image of the check 300 and store the check information in a datastore as metadata (e.g., the datastore 254 of FIG. 2). In some embodiments, the pieces of check information may be stored in the datastore individually. In other embodiments, multiple pieces of check information may be stored in the datastore together.

Figure 4:
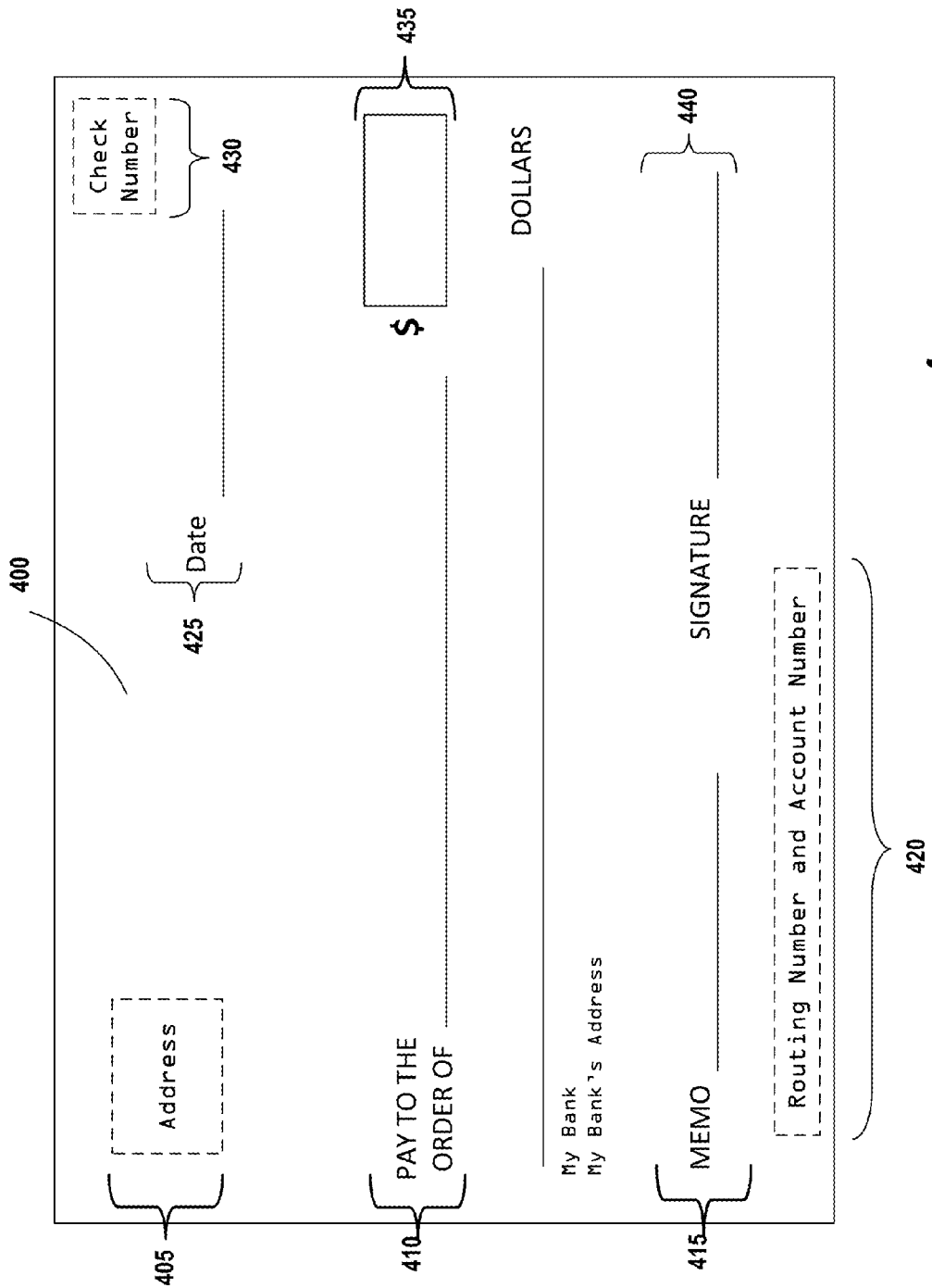
FIG. 4 illustrates an exemplary template of a financial record in accordance with various embodiments.

Referring now to FIG. 4, a check template 400 illustrated. In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 100 any other system can "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

Figure 5:
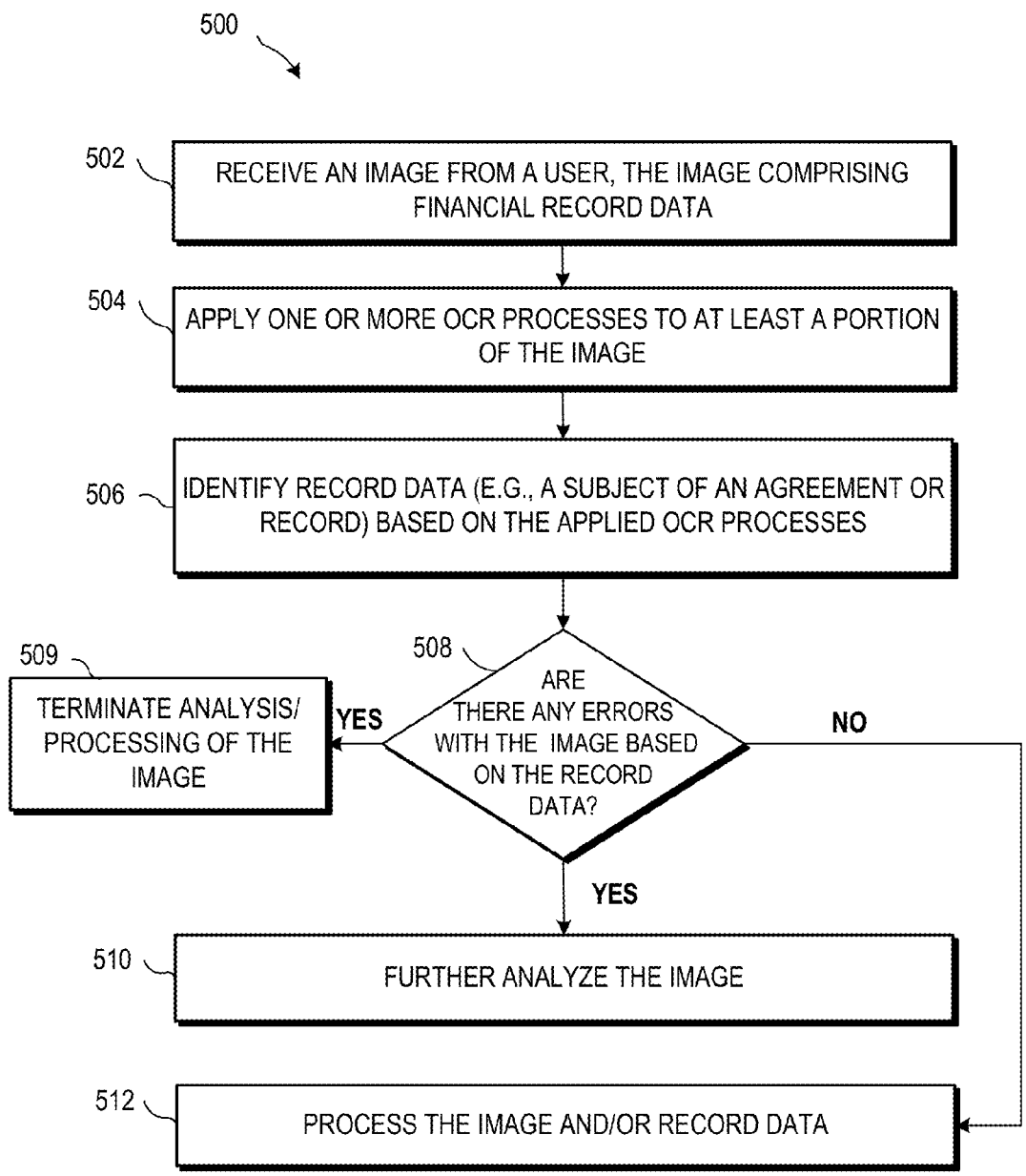
FIG. 5 is a flowchart illustrating a system and method for extracting check data for error detection in accordance with various embodiments.

FIG. 5 illustrates a flowchart providing an overview of a process 500 for using data extracted from images for detecting errors. One or more devices, such as the one or more computing devices and/or one or more other systems and/or servers of FIG. 2, can be configured to perform one or more steps of the process 500 and/or process 600 described below. In some embodiments, the one or more devices performing the steps are associated with a financial institution. In other embodiments, the one or more devices performing the steps are associated with a merchant, business, partner, third party, credit agency, account holder, customer, entity associated with an ACH network, and/or user.

As illustrated at block 502, an image is received from a user. In some embodiments, the image includes one or more images. For example, if the image is of paper document, the image may include the front and back portions of the document. In some embodiments, the image comprises financial record data. The image, in some embodiments, includes at least a portion of a financial record, a check, or a non-financial record. The image can further include non-financial record data. For example, if the image comprises a product review or a lease agreement, financial record data such as purchase amounts or monthly payments may be included in the image along with non-financial record data such as personal opinions and product descriptions. The user includes account holders, parties to an agreement, customers of a financial institution, agent of the user, or any other entity that provides the image to the system or process 500.

As illustrated at block 504, one or more OCR processes are applied to at least a portion of the image. Further details regard the OCR processes are described hereinabove with regard to FIG. 1.

As illustrated at block 506, record data is identified based on the applied OCR processes. In some embodiments, the one or more OCR processes convert image to text data. The system of process 500 can search the text data using key terms or algorithms to identify the record data. In other cases, the portion of the image to which the OCR processes are applied includes the record data. For example, if the OCR process is applied only to portions of the image identified as containing the subject of an agreement, then text data resulting from the applied OCR processes can be identified as the subject data. Any type of data, including financial record data, markings on the image, and/or non-financial data can be defined as the record data. Exemplary record data includes subjects of a record, terms of a record, transaction amounts, account numbers, contact information, names of parties to an agreement, and the like.

As illustrated at determination block 508, a determination is made as to whether or not there are any errors associated with the check image based on the record data. As defined herein, "errors" include, but is not limited to intentional or unintentional issues associated with the image or the processing of the image. Exemplary errors include mistakes, misappropriations, inaccuracies, or fluctuations related to the image itself, the image file, text formatting, document stylization, transactions, processing of financial records, or data in the image. The errors can range from slight errors such as trivial misspellings, mismatching fonts, or paragraph formatting errors to more serious errors such as a misappropriation of funds. The detection of errors associated with the image is described in greater detail below with regard to FIGS. 6-10.

As illustrated at block 509, the analysis and/or processing of the image is terminated if errors associated with the image are detected. The decision to terminate the process 500 rather than further analyze the image can be based on the type of errors detected, the method of receiving the image, the account, predetermined instructions, and the like. For example, if the image is received via a mobile application and mobile device in communication with the system 500, predetermined rules may automatically block further processing of the image. Check images uploaded via a mobile application stored on a mobile device, for example, may require very strict protocol such that any errors detected in the check image may result in automatic termination of the analysis or processing of the check image. In such cases, the system may provide a notification on the display of the mobile device indicating that processing has been blocked and that the customer must deposit the check image in person at a financial institution. In other cases, the analysis or processing of the check image is terminated based on the seriousness of the errors detected. For example, trivial errors such as paragraph formatting may not result in termination of the analysis of the image, but more serious errors such as an unconfirmed signature on the back of the check may result in termination of the processing of the image. In other case, as described hereinabove, the process 500 may continue to block 510 and not terminate regardless of the type of errors detected.

As illustrated at block 510, the image is further analyzed if errors are detected. In some embodiments, the one or more OCR processes is reapplied to at least a portion of the image. For example, the one or more OCR processes may be applied to a second portion of the image. If the first application of the one or more OCR process was applied only to the portion of the image corresponding to the front of a record, the second application of the one or more OCR processes can include a second portion of the image corresponding to the back of the record. In other cases, the one or more OCR processes may be applied to the same portion of the image in the first application, but the OCR process or image may be updated or otherwise changed before the reapplication step. Further still, other image analysis techniques may be applied to the image. In other embodiments, the image is provided to an investigation group for further analysis. The investigation group and reapplication of the OCR processes or other processes are detailed below with regard to FIG. 6.

As illustrated at block 512, the image and/or record data is processed if no errors are detected. For example, the image or a portion of the image may be discarded, stored, formatted, renamed, resized, compressed, and/or portioned, or the pixel quality of the image may be increased or decreased. Additionally, the system processes the record data or other data associated with the image. For example, the system may authorize or complete transactions, transfer funds, modify accounts, publish data, provide offers to the user, prepare reports, and the like.

Figure 6:
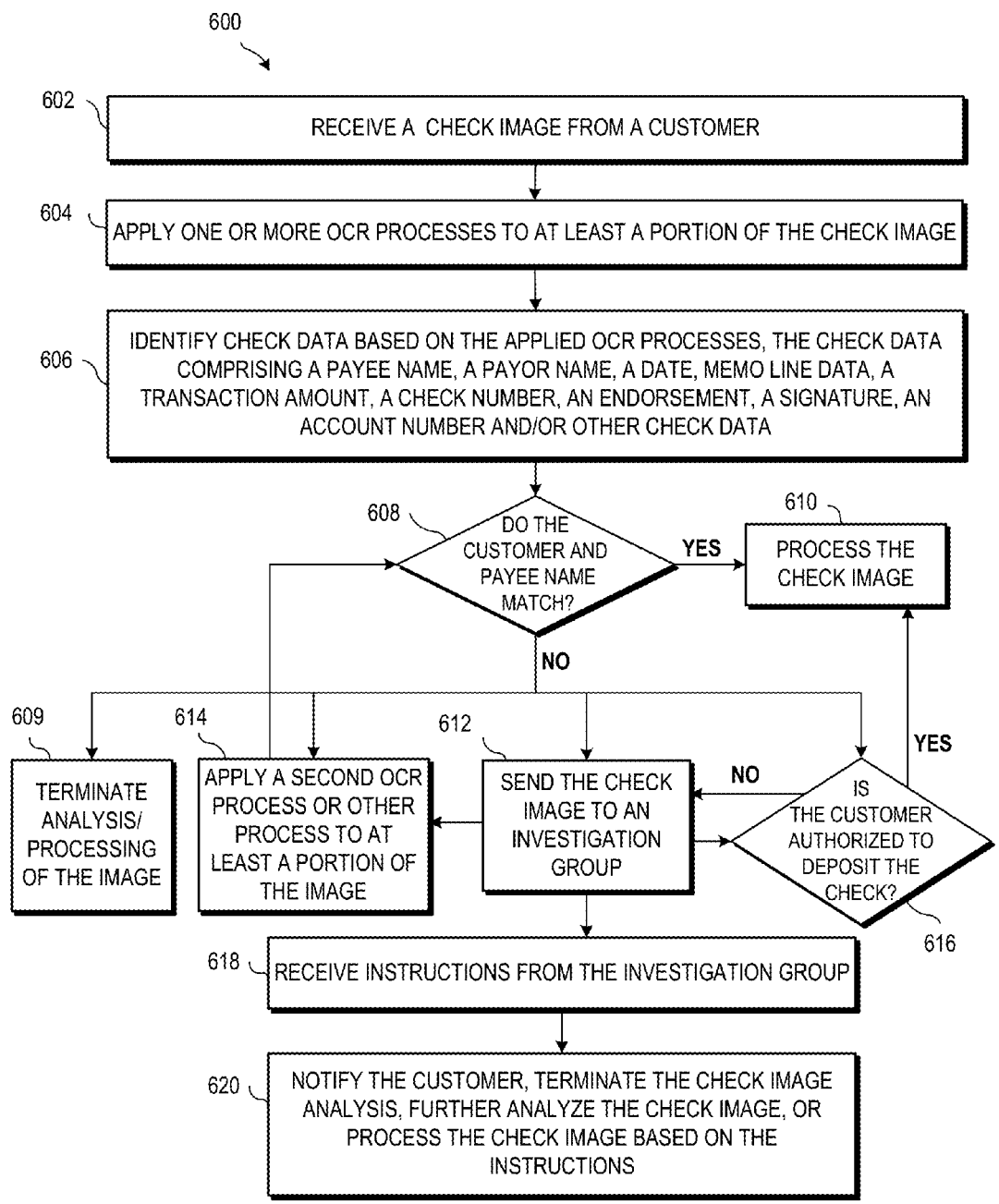
FIG. 6 is a flowchart illustrating a system and method for extracting check data for error detection in accordance with various embodiments.

Referring now to FIG. 6, a block diagram process flow of a process 600 for extracting data from check images for detecting errors is illustrated. The process 600 can incorporate one or more of the steps of processes 100 and 500 discussed hereinabove.

As illustrated at block 602, a check image is received from a customer. The check image, in some embodiments, includes one or more check images. The check image can be related to one or more check transactions such as deposits, withdrawals, purchases, and the like. The customer includes image owners, account holders, agents of account holders, family members of account holders, financial institution customers, merchant customers, and the like. In some embodiments, the check image comprises a check issued by a payor having a third party bank account. Although the process 600 in the illustrated embodiment is directed to checks, it will be understood that any financial record can be used.

As illustrated at block 604, one or more OCR processes is applied to at least a portion of the check image. The one or more OCR processes is described in greater detail above with regard to FIG. 1.

As illustrated at block 606, check data is identified based on the applied OCR processes. In some embodiments, the check data includes a payee name, a payor name, a date, memo line data, a transaction amount, a check number, an endorsement, a signature, an account number, and other check data. The check data can further include the financial record data and marking described hereinabove.

As illustrated at decision block 608, a determination is made as to whether the customer and the payee name match. In some embodiments, the payee name on the front of the check and/or the signature or other endorsement on the back of the check is analyzed. For example, the payee name (e.g., in stamped, typed, or handwritten text) is compared to the customer of the account to which the customer requests the check to deposited. Further, the system of process 600 reviews the signature or other endorsement on the back of the check. In such cases, the one or more OCR processes can be applied to the back portion of the check image. The endorsement may be handwritten, stamped (e.g., if the payee is a company), typed, and the like. In cases where the endorsement is a signature, the system can use the OCR process and/or other technique to verify the endorsement. If the check data repository associated with the one or more OCR processes does not include a verified signature of the customer, the portion of the check image containing the signature may be compared to a stored image of the customer signature via image overlay to confirm that the signatures match. In still other exemplary instances, a signature or other endorsement on the check image (e.g., on the back portion of the check) is confirmed and not further analyzed. In such instances, an endorsement is enough and a verification procedure is not initiated.

If the customer and the payee name match, the check image is processed as illustrated at block 610. In some embodiments, at least a portion of the check amount of the check in the check image is deposited into the customer's account. Further, the system of process 600 may authorize or complete transactions, transfer funds, modify accounts, publish data, provide offers to the user, prepare reports, and the like. As discussed above with regard to FIG. 5, the image or a portion of the image may be discarded, stored, formatted, renamed, resized, compressed, and/or portioned, or the pixel quality of the image may be increased or decreased.

As illustrated at block 609, analysis and/or processing of the check image is terminated if the customer and payee name do not match. Termination of the analysis and/or processing of the image is discussed in further detail above with regard to FIG. 5.

Additionally or alternatively, as illustrated at block 612, the check image is sent to an investigation group if the customer and payee name do not match. For example, a financial institution may have a group that specializes in misappropriated checks, check image duplicate detection, or other processes that can determine the cause of the mismatch or determine the reasons that the customer is not authorized to deposit the check image. In some embodiments, the investigation group pre-processes, sorts, categorizes, or does other pre-investigatory work.

In other cases, the system of process 600 applies a second OCR process or other processes to at least a portion the check image as illustrated at block 614. In some embodiments, the image portion to which the first OCR process is applied is the same as the image portion to which the second OCR process is applied. For example, the first OCR process may be applied to the entire front portion of the check and the second OCR process may also be applied to the same portion. In other embodiments, the image portion to which the first OCR process is applied is different or at least partially different from the image portion to which the second OCR process is applied. For example, the image portion associated with the second OCR process may be larger or smaller than the image portion associated with the first OCR process. The first OCR process may be applied to an entire front portion of a check image, and the second OCR process may be applied to only the memo line portion of the check image.

In other examples, the first image portion is entirely different from the second image portion. For example, the first OCR process may be applied to a front portion of the check image, while the second OCR process may be applied to a back portion. In additional embodiments, the second OCR process is applied to an additional image. In some cases, the additional image may be associated or not associated with the check of the check image. For example, the additional image may include a different financial record than the check, such as an insurance claim, or the additional image may be an additional image of the check. The additional image may be an image of the check captured at a different angle, in a different light, with different equipment, or an image captured of the check after it has been modified. The paper check may be, for instance, altered to remove creases, dirt, and obstructions, or the paper check may have been repaired prior to capturing the additional image.

In additional embodiments, the second OCR process is the same as the first OCR process. For example the same or similar OCR processes may be applied to different portions of the check image. In other embodiments, the second OCR process is different from the first OCR processes. For example, the system may first update the OCR process (e.g., update terms in the check data repository) before applying the second OCR process. In other cases, the first and second OCR processes include different algorithms, sequencing, or steps. In such cases, the additional OCR process or other processes is applied to gather additional details or improve the information previously gathered.

In additional embodiments, the system confirms that the payee is not the customer if the customer and the payee name do not match. The OCR processes, the information inputted by the operator or the customer (see, e.g., FIG. 1), or any other process used to identify the check data or any other information contained in the check image may result in incorrect payee name identification due to mistakes, misspellings, image defects, and the like. The OCR processes may be re-applied as discussed above, or the inputted information corrected (e.g., the check data repository updated to correct misspelling or other incorrect data). In addition, other data identification and extractions may be employed such as image overlay techniques and microline readings to correct mistakes in the check data and/or confirm that the payee name and the customer do not match. In other embodiments, the system receives input from the customer, the payee, or a party to the ACH transaction agreement to confirm that the customer and the payee name do not match.

Further as illustrated at block 616, the system makes the determination as to whether the customer is authorized to deposit the check image upon determining that the customer name and the payee name do not match. If the system determines that the customer is authorized to deposit the check, the check image is processed as described hereinabove. In cases where the customer and payee name are mismatched or where the customer is unauthorized to deposit the check image based on image file instability, image defects, outdated or incorrect operator input information, or issues related to the one or more OCR processes, the system may first address issues with the check image itself or update the OCR software or input information, and then re-apply the one or more OCR processes as discussed above.

In some embodiments, the customer deposits the check (e.g., uploads the check image via an online banking account) into the customer's financial account (e.g., a checking account, savings account, or other banking account). In such cases, the system determines if the funds from the check can be deposited into the customer's account. For example, the system may determine if the customer is authorized to deposit the funds in the account based on government laws, internal policies, account policies, an agreement between the customer and the payee, and the like. The customer may be authorized to deposit the check in situations where the customer is an agent of the payee such as a legal guardian or family member. In other instances, the account policy may allow a joint account owner to deposit funds to the joint account on behalf of another joint account owner. In additional examples where the system is not able to detect a connection between the payee and the customer, the system may determine that the customer is not authorized to deposit the check image.

In other embodiments, whether the customer is or is not authorized to deposit the check image is based on the check image itself. For example, if the check or check image lacks an endorsement on the back of the check, lacks a signature by the payor, is determined to be a duplicate, or has other insufficiencies, the system may determine that the customer is not authorized to deposit the check image.

As illustrated at block 618, instructions are received from the investigation group. The investigation group, in some cases, reviews the check image and the check data to identify the instructions. In some embodiments, the investigation group instructs the system of process 600 to apply a second OCR process or other process to at least a portion of the image and/or determine whether a customer is authorized to deposit the check. In other embodiments, the instructions comprise notification, termination, analysis, processing, or other instructions.

As illustrated at block 620, the customer is notified, check image analysis is terminated, the check image is further analyzed, the check image is processed, or combinations thereof based on the instructions. For example, the system of process 600 may be instructed to apply the second OCR process. In other cases, the system may provide the customer via an online banking account, a mobile application, text, email, or other communication with a notification. The notification can be used to prompt the customer to provide additional information to complete the check image analysis and confirm or deny deposit authorization. Also, the notification can be used to notify the customer about processing delays, reasons for delay, the date that the check will be deposited, and the like. In some embodiments, the system of process 600 terminates the check analysis. For example, if it is determined that the customer is not authorized to deposit the check, the check analysis ends. In other examples, the check analysis ends if the check image is determined to be a duplicate, contains an error, or is otherwise unsatisfactory. In some cases, the check image is discarded. A new check image of the paper check may be captured or received in response the termination of the check analysis.

FIGS. 7-10 illustrate exemplary check images. In some embodiments, the processes 100, 500, and 600 are applied to at least a portion of the check images in FIGS. 7-10 for determining errors in the images. Although the illustrated embodiments in FIGS. 7-10 are directed to check images, it will be understood that other types of images can be used.

FIG. 7 illustrates an image of a check 700 comprising a front image portion 710 and a back image portion 750 of the check 700. The front image portion 710 and back image portion 750 may be included in a single image or may be separated into multiple images. The front portion 710 includes a payee name field 712. As shown in the illustrated embodiment, the check is made payable to a designated payee, "Payee Name 1." In some embodiments, the designated payee is not the customer depositing the check or uploading the check image 700 to an online account.

Further illustrated in FIG. 7 is the back portion 750 of the check 700, which includes an endorsement field 755. The endorsement field 755 in FIG. 7 includes an endorsement statement. In some embodiments, the system analyzes the back image portion 750 (e.g., via an OCR process) to determine if the customer (i.e., Payee Name 2) is authorized to deposit the check. In this case, the payee identified on the front of the check has assigned the check over to the customer in the endorsement field 755.

Figure 8:
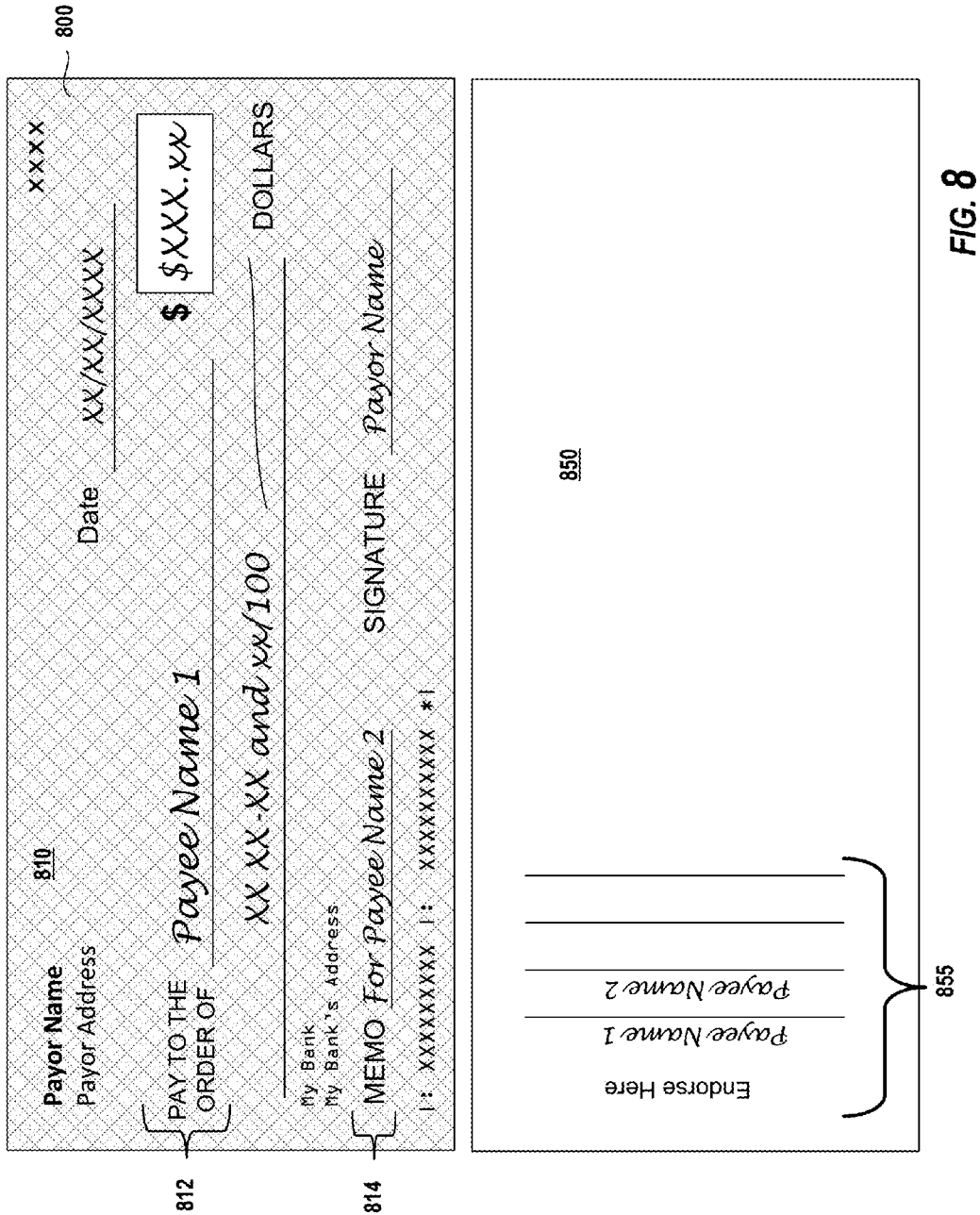
FIG. 8 illustrates an exemplary image of a financial record in accordance with various embodiments.

Turning now to FIG. 8, an image of a check 800 is illustrated. A front image portion 810 of the check 800 includes a payee name field 812 and a memo line field 814. The payee name filed 812 includes the designated payee, "Payee Name 1." The memo line field 814 includes instructions for assigning the check to another payee, i.e., "Payee Name 2." In some embodiments, the payee in the memo line corresponds to a customer who deposits the check 800 into an account. A system, such as the system of process 100, 500, and/or 600, may determine whether or not the customer is authorized to deposit the check 800 based on the data extracted from the front image portion 810 such as the memo line data in the memo line field 814.

Also illustrated in FIG. 8 is a back image portion 850 of the check 800, which includes an endorsement field 855. The endorsement field 855 includes the signatures of Payee Name 1 and Payee Name 2. In cases where a customer (i.e., Payee Name 2) has deposited the check 800 into an account, the systems may use the data in the endorsement field 855 to determine whether or not the customer has the authority to deposit the check 800. Here, the system can determine that the customer is authorized based on the data extracted from the memo line field 814 and/or the data extracted from the endorsement field 855.

Figure 9:
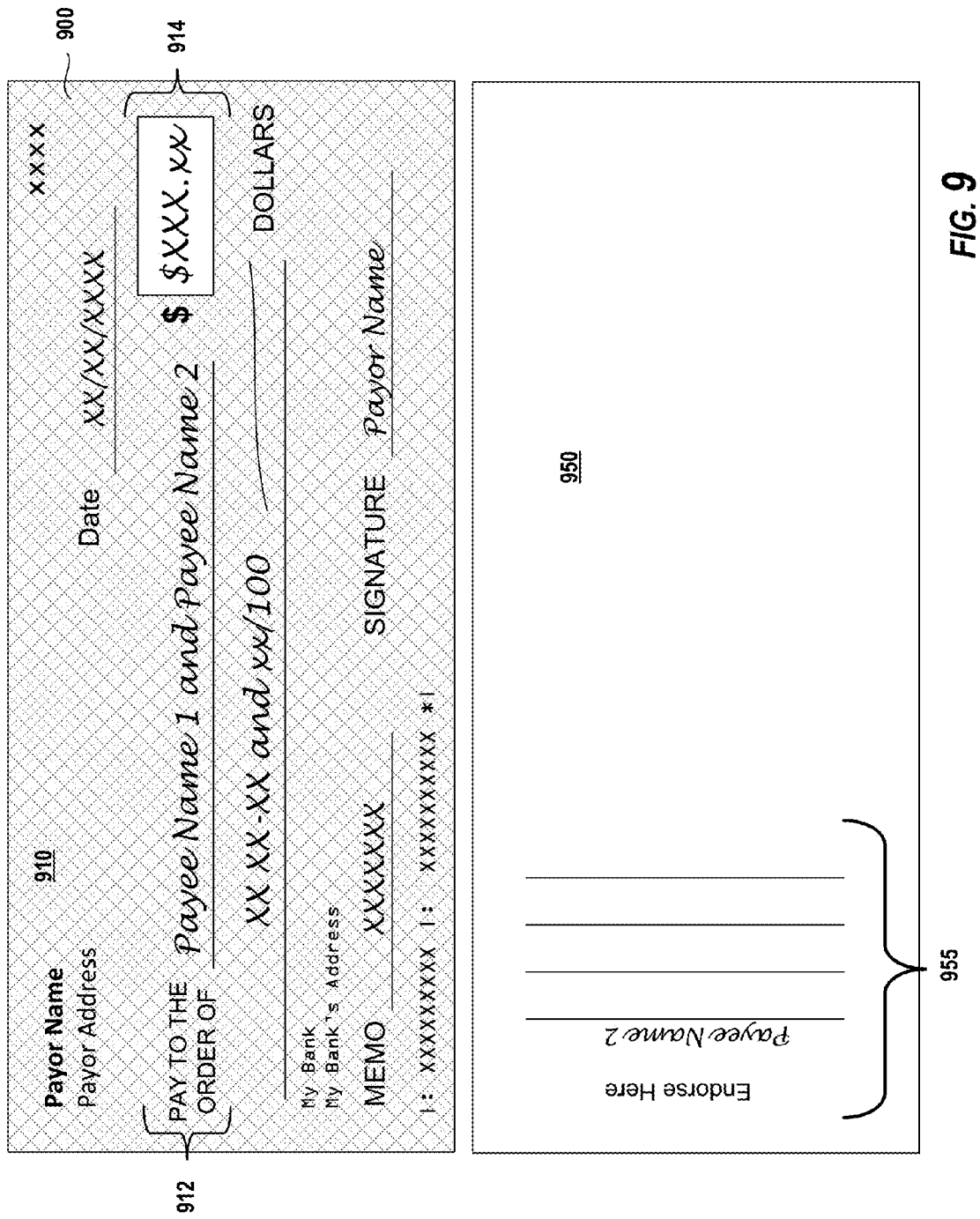
FIG. 9 illustrates an exemplary image of a financial record in accordance with various embodiments.

FIG. 9 illustrated an image of check 900, which includes a front image portion 910 and a back image portion 950 of the check 900. The front image portion 910 includes a payee name field 912. In the illustrated embodiment, the payee name field 912 includes multiple payees designated as "Payee Name 1" and "Payee Name 2." The back portion 950 includes an endorsement field 955, which includes the signature of the Payee Name 2. In some embodiments, the Payee Name 2 corresponds to a customer who has deposited the check 900 into a financial account. Based on data extracted from the front portion 910 in the payee name field 912 or data extracted from the back portion 950 in the endorsement field 955, a determination can be made that the customer is authorized to deposit the check 900. The data may be extracted via an OCR process or other processes noted herein.

In further embodiments, a system such as the system of process 100, 500, or 600 determines the amount of the check 900 that the customer is entitled to receive in the deposit. In cases where both payees designated in the payee name field 912 are joint account owners, the system may deposit the entire amount of the check into a joint account. In other cases, the system may determine that the customer depositing the check 900 is only entitled to a portion of the check amount. In such cases, the system may deposit a default amount (e.g., 50%) or an amount corresponding to an agreement, internal policies, or regulations. The system may also prompt input from the payees to determine the correct amount to deposit into the customer's account.

Figure 10:
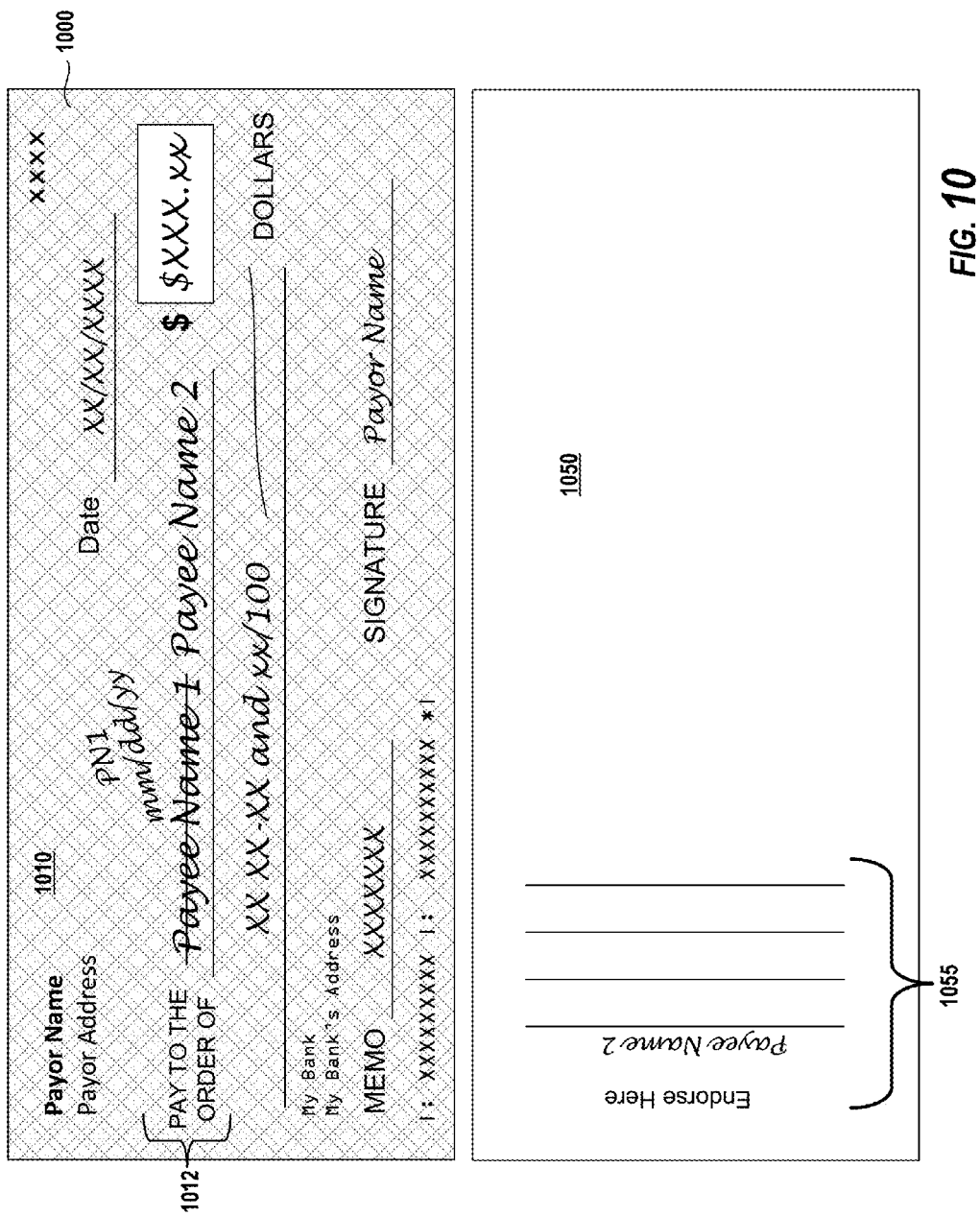
FIG. 10 illustrates an exemplary image of a financial record in accordance with various embodiments.

In FIG. 10, an image of a check 1000 is illustrated. A front image portion 1010 of the check 1000 includes a payee name field 1010. As shown in the illustrated embodiment, the payee name field 1012 includes a first payee designated as "Payee Name 1" and a second payee designated as "Payee Name 2." The first payee is crossed out in the payee name field 1010, and initials of the entity making the changes to the payee name field 1010 as well as the date of the changes is illustrated. In this embodiment, the Payee Name 1 is the entity that has made the modification to the payee name field 1010. In other examples, the payor may be the entity that makes the changes.

Further illustrated in FIG. 10 is a back image portion 1050 of the check 1000, which includes an endorsement field 1055. In the endorsement field 1055, the signature of Payee Name 2 is included. In some embodiments, Payee Name 2 corresponds to a customer who deposits the check 1000 into an account. For example, the customer may upload the front image portion 1010 and/or the back image portion 1050 via an online account or mobile account. A system such as the system of process 100, 500, or 600 may determine whether or not the customer is authorized to make the deposit. The system may use data extracted from the front image portion 1010 or the back image portion 1050 to determine that the customer, i.e. Payee Name 2, is authorized to deposit the check 1000.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for identifying errors based on data extracted from a first image, the system comprising:
   a computer apparatus including a processor and a memory; and a software module stored in the memory, comprising executable instructions that when executed by the processor cause the processor to:
      receive the first image from a user, the first image comprising a financial record;

apply a first optical character recognition process to at least a portion of the first image, wherein the first optical character recognition process comprises a first algorithm;

identify a first set of record data based on the applied first optical character recognition process comprising at least a name of a party to the financial record;

identify errors associated with the first image based on the first set of record data, the errors comprising at least one of errors associated with the first image, errors associated with a financial transaction, errors associated with processing of the financial record, and errors in the first set of record data;

assign a confidence level to one or more portions of the financial record based on the identified first set of record data and the identified errors of the first image, wherein the confidence level is a pass rating or a fail rating;

determine that a first portion of the one or more portions of the financial record has a first confidence level of a fail rating;

prompt the user to provide a second image of the same side of the first image of the financial record in response to the determination that the first portion of the financial record has a first confidence level of a fail rating, wherein the second image comprises the first portion of the financial record, and wherein the second image portrays the first portion of the financial record at a different angle, portrays the first portion of the financial record in a different light, is captured with different image capturing equipment than the first image, or is a modified version of the first image;

receive the second image from the user via a user computing device associated with the user, wherein the user computing device comprises at least an image capture device that captures the second image and a communication device that communicates the second image from the user;

apply a second optical character recognition process to at least a portion of the second image, wherein the portion of the second image comprises the first portion of the financial record, and wherein the second optical character recognition process comprises a second algorithm that is different from the first algorithm; and identify a second set of record data based on the second optical character recognition process comprising at least one new record data that is not included in the first set of record data.

2. The system of claim 1, wherein the executable instructions further cause the processor to:
send the second image to an investigation group;
receive instructions from the investigation group; and
process the financial record based on the instructions.

3. The system of claim 1, wherein the executable instructions further cause the processor to:
identify a payee name in the second image based on applying the second optical character recognition process; and
compare the payee name and the user,
wherein the financial record comprises a check.

4. The system of claim 3, wherein the executable instructions further cause the processor to:
determine that the payee name and the user match; and
process the check in response to the match.

5. The system of claim 3, wherein the executable instructions further cause the processor to:
determine that the payee name and the user do not match.

6. The system of claim 5, wherein the executable instructions further cause the processor to:
determine that the user is authorized to deposit the check; and
process the check in response to the authorization determination.

7. The system of claim 5, wherein the executable instructions further cause the processor to:
determine that the user is not authorized to deposit the check; and
send the check image to an investigation group.

8. The system of claim 1, wherein the first set of record data further comprises a payor name, an account number, terms of the financial record, time period that the financial record is in effect, check numbers, endorsements, merchant codes, file identifiers, or source identifiers.

9. A computer program product for identifying errors based on data extracted from a first image, the computer program product comprising:

at least one non-transitory computer readable storage medium having computer readable program code embodied therewith, the computer readable program code comprising:

computer readable program code configured to receive the first image from a user, the first image comprising a financial record;

computer readable program code configured to apply a first optical character recognition process to at least a portion of the first image, wherein the first optical character recognition process comprises a first algorithm;

computer readable program code configured to identify a first set of record data based on the applied first optical character recognition process comprising at least a name of a party to the first financial record;

computer readable program code configured to identify errors associated with the first image based on the first set of record data, the errors comprising at least one of errors associated with the first image, errors associated with a financial transaction, errors associated with processing of the financial record, and errors in the first set of record data;

computer readable program code configured to assign a confidence level to one or more portions of the financial record based on the identified first set of record data and the identified errors of the first image, wherein the confidence level is a pass rating or a fail rating;

computer readable program code configured to determine that a first portion of the one or more portions of the financial record has a first confidence level of a fail rating;

computer readable program code configured to prompt the user to provide a second image of the same side of the first image of the financial record in response to the determination that the first portion of the financial record has a first confidence level of a fail rating, wherein the second image comprises the first portion of the financial record, and wherein the second image portrays the first portion of the financial record at a different angle, portrays the first portion of the financial record in a different light, is captured with different image capturing equipment than the first image, or is a modified version of the first image;

computer readable program code configured to receive the second image from the user via a user computing device associated with the user, wherein the user computing device comprises at least an image capture device that captures the second image and a communication device that communicates the second image from the user;

computer readable program code configured to apply a second optical character recognition process to at least a portion of the second image, wherein the portion of the second image comprises the first portion of the financial record, and wherein the second optical character recognition process comprises a second algorithm that is different from the first algorithm; and computer readable program code configured to identify a second set of record data based on the second optical character recognition process comprising at least one new record data that is not included in the first set of record data.

10. The computer program product of claim 9, comprising the computer readable storage medium having computer readable program code embodied therewith, the computer readable program code further configured to:
send the second image to an investigation group;
receiving instructions from the investigation group; and
process the image based on the instructions.

11. The computer program product of claim 9, comprising the computer readable storage medium having computer readable program code embodied therewith, the computer readable program code further configured to:
identify a payee name in the second image based on applying the second optical character recognition process; and
compare the payee name and the user, wherein the financial record comprises a check.

12. The computer program product of claim 9, comprising the computer readable storage medium having computer readable program code embodied therewith, the computer readable program code further configured to determine that the payee name and the user do not match.

13. The computer program product of claim 12, comprising the computer readable storage medium having computer readable program code embodied therewith, the computer readable program code further configured to determine that the user is authorized to deposit the check; and process the check in response to the authorization determination.

14. A computer-implemented method for identifying errors based on data extracted from a first image, the method comprising:
receiving the first image from a user, the first image comprising a financial record;
applying, by a processor, a first optical character recognition process to at least a portion of the first image, wherein the first optical character recognition process comprises a first algorithm;
identifying, by a processor, a first set of record data based on the applied first optical character recognition process comprising at least a name of a party to the financial record;
identifying, by a processor, errors associated with the first image based on the first set of record data, the errors comprising at least one of errors associated with the first image, errors associated with a financial transaction, errors associated with processing of the financial record, and errors in the first set of record data;
assigning, by a processor, a confidence level to one or more portions of the financial record based on the identified first set of record data and the identified errors of the first image, wherein the confidence level is a pass rating or a fail rating;
determining, by a processor, that a first portion of the one or more portions of the financial record has a first confidence level of a fail rating;
prompting, by a processor, the user to provide a second image of the same side of the first image of the financial record in response to the determination that the first portion of the financial record has a first confidence level of a fail rating, wherein the second image comprises the first portion of the financial record, and wherein the second image portrays the first portion of the financial record at a different angle, portrays the first portion of the financial record in a different light, is captured with different image capturing equipment than the first image, or is a modified version of the first image;
receiving, by a processor, the second image from the user via a user computing device associated with the user, wherein the user computing device comprises at least an image capture device that captures the second image and a communication device that communicates the second image from the user;
applying, by a processor, a second optical character recognition process to at least a portion of the second image, wherein the portion of the second image comprises the first portion of the financial record, and wherein the second optical character recognition process comprises a second algorithm that is different from the first algorithm; and
identifying, by a processor, a second set of record data based on the second optical character recognition process comprising at least one new record data that is not included in the first set of record data.

15. The computer-implemented method of claim 14, further comprising:
sending, by a processor, the second image to an investigation group;
receiving instructions from the investigation group; and
processing, by a processor, the financial record based on the instructions.

16. The computer-implemented method of claim 14, further comprising:
identifying, by a processor, a payee name in the second image based on applying the second optical character recognition process;
comparing the payee name and the user;
determining that the payee name and the user match; and
processing the financial record in response to the match.

* * * * *